United States Patent
Delaney et al.

(10) Patent No.: US 12,424,074 B2
(45) Date of Patent: Sep. 23, 2025

(54) MESSAGE GENERATION FOR DETECTED DISRUPTION

(71) Applicant: Lenovo (Singapore) Pte. Ltd., Singapore (SG)

(72) Inventors: Mark Delaney, Raleigh, NC (US); Arnold Weksler, Raleigh, NC (US); John C Mese, Cary, NC (US); Nathan Peterson, Oxford, NC (US); Russell Speight VanBlon, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 17/853,147

(22) Filed: Jun. 29, 2022

(65) Prior Publication Data
US 2024/0005772 A1    Jan. 4, 2024

(51) Int. Cl.
*G08B 21/18*    (2006.01)
*H04L 65/403*    (2022.01)

(52) U.S. Cl.
CPC ............ *G08B 21/18* (2013.01); *H04L 65/403* (2013.01)

(58) Field of Classification Search
CPC .............................. G08B 21/18; H04L 65/403
USPC ........................................................ 709/204
See application file for complete search history.

(56) References Cited

U.S. PATENT DOCUMENTS

| | | | | |
|---|---|---|---|---|
| 11,546,181 | B1* | 1/2023 | Sivaswamy | H04W 4/021 |
| 2004/0218553 | A1* | 11/2004 | Friedrich | H04M 3/20 |
| | | | | 370/260 |
| 2007/0022160 | A1* | 1/2007 | Dauguet | G06Q 10/107 |
| | | | | 709/204 |
| 2014/0105407 | A1* | 4/2014 | Herger | H04M 9/08 |
| | | | | 381/57 |
| 2016/0295021 | A1* | 10/2016 | Vendrow | H04L 65/80 |
| 2019/0068663 | A1* | 2/2019 | Anders | H04N 7/155 |
| 2019/0342107 | A1* | 11/2019 | Vogel | H04L 12/1822 |
| 2020/0035254 | A1* | 1/2020 | Boss | G10L 15/16 |
| 2022/0050658 | A1* | 2/2022 | Silverstein | G10L 25/51 |
| 2022/0239848 | A1* | 7/2022 | Swierk | H04N 7/147 |
| 2022/0247588 | A1* | 8/2022 | Ittelson | H04L 51/224 |
| 2022/0303393 | A1* | 9/2022 | Smith | H04M 3/2236 |
| 2022/0405907 | A1* | 12/2022 | Daha | G06T 7/194 |
| 2023/0033595 | A1* | 2/2023 | Shetty | G06F 40/166 |
| 2023/0064353 | A1* | 3/2023 | White, Jr. | H04L 12/1822 |
| 2023/0068117 | A1* | 3/2023 | Johnston | H04L 65/403 |
| 2023/0090613 | A1* | 3/2023 | Covell | H04L 65/1093 |
| | | | | 709/204 |
| 2023/0133750 | A1* | 5/2023 | Shayne | H04N 7/147 |
| | | | | 348/14.09 |
| 2023/0269287 | A1* | 8/2023 | Vashisht | H04L 65/1083 |
| | | | | 348/14.03 |

* cited by examiner

*Primary Examiner* — Nicholas R Taylor
*Assistant Examiner* — Chong G Kim
(74) *Attorney, Agent, or Firm* — FERENCE & ASSOCIATES LLC

(57) ABSTRACT

One embodiment provides a method, the method including: detecting, during a meeting, a disruption within an environment surrounding a user, wherein the meeting is facilitated using a communication medium and comprises at least one participant remote to the user; determining, utilizing at least one sensor, a source of disruption; generating, utilizing a messaging generator system, a message identifying the disruption; and providing, to the at least one participant, the message. Other aspects are described and claimed.

20 Claims, 3 Drawing Sheets

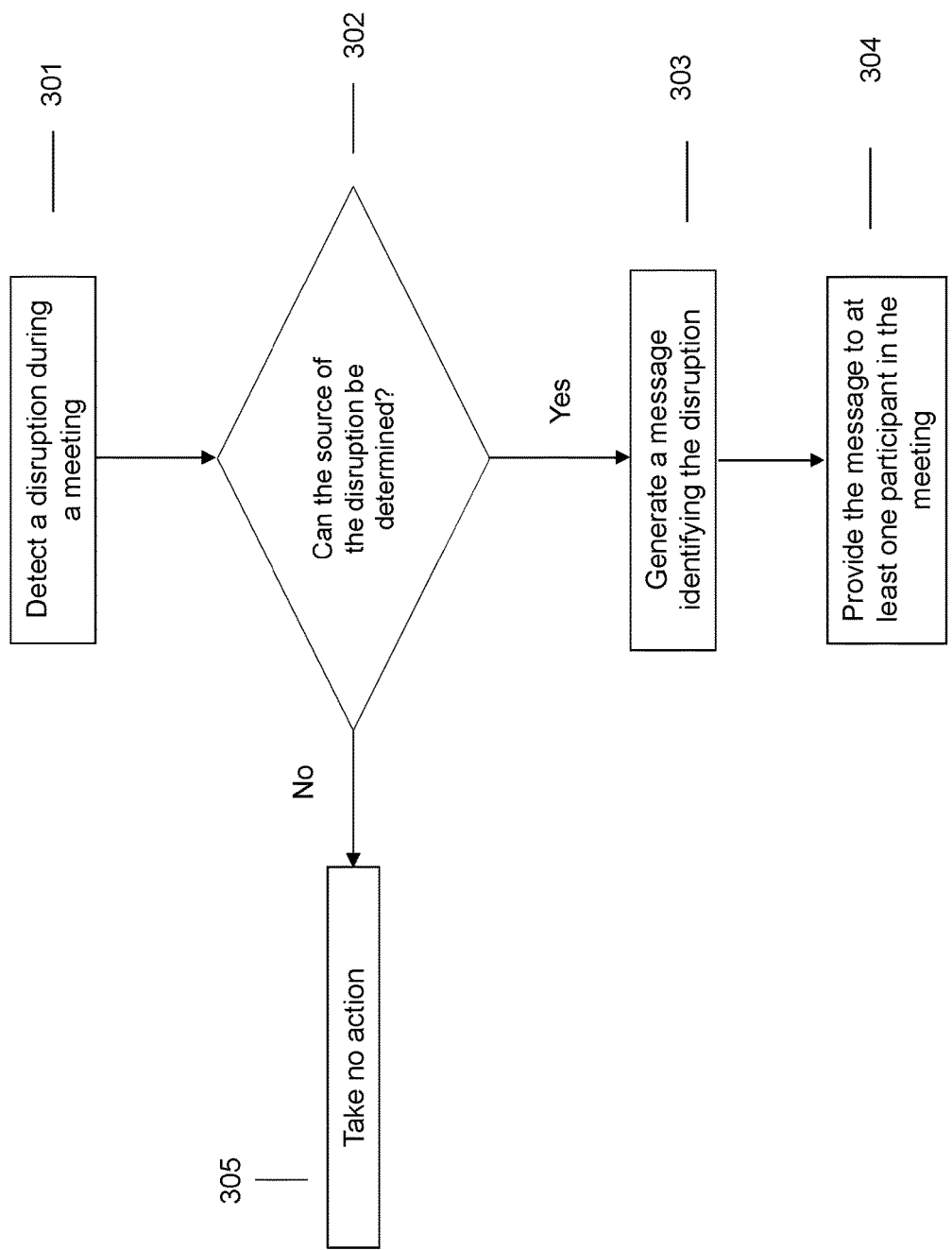

1

MESSAGE GENERATION FOR DETECTED DISRUPTION

BACKGROUND

Attending virtual or remote meetings has become common business practice recently due to the increase in people working away from an office building and people working together while in different geographical locations. Companies have recognized the benefit of remote meetings allowing people to work together while still geographically separate. The ability to give employees the freedom to work-from-home, or remotely, has provided benefits to both the employees and the company. For example, an employee may reduce a cost of daycare for children with the ability to work from their home, and overall a company may reduce utility costs, such as electricity, internet, rent, and the like, without the need of having all employees on site or in the office. Additionally, for those who may travel for work and/or communicate with others across vast distances, for example, in different countries, remote meetings provide a platform for a plurality of employees, workers, company representatives, and the like, to communicate in a singular location regardless of where an attendee of a meeting is located.

BRIEF SUMMARY

In summary, one aspect provides a method, the method including: detecting, during a meeting, a disruption within an environment surrounding a user, wherein the meeting is facilitated using a communication medium and comprises at least one participant remote to the user; determining, utilizing at least one sensor, a source of disruption; generating, utilizing a messaging generator system, a message identifying the disruption; and providing, to the at least one participant, the message.

Another aspect provides an information handling device, the information handling device including: a processor; a memory device that stores instructions that, when executed by the processor, causes the information handling device to: detect, during a meeting, a disruption within an environment surrounding a user, wherein the meeting is facilitated using a communication medium and comprise at least one participant remote of the user; determine, utilizing a least one sensor, a source of the disruption; generate, utilizing a messaging generator system, a message identifying a disruption; and provide, to the at least one participant, the message.

A further aspect provides a product, the product including: a computer-readable storage device that stores executable code that, when executed by a processor, causes the product to: detect, during a meeting, a disruption within an environment surrounding a user, wherein the meeting is facilitated using a communication medium and comprise at least one participant remote of the user; determine, utilizing a least one sensor, a source of the disruption; generate, utilizing a messaging generator system, a message identifying a disruption; and provide, to the at least one participant, the message.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

BRIEF DESCRIPTION OF THE SEVERAL VIEWS OF THE DRAWINGS

FIG. 3 illustrates an example method for generating a message based upon a determined disruption detected and thereafter providing the message to the attendees of the meeting.

DETAILED DESCRIPTION

Figure 1:
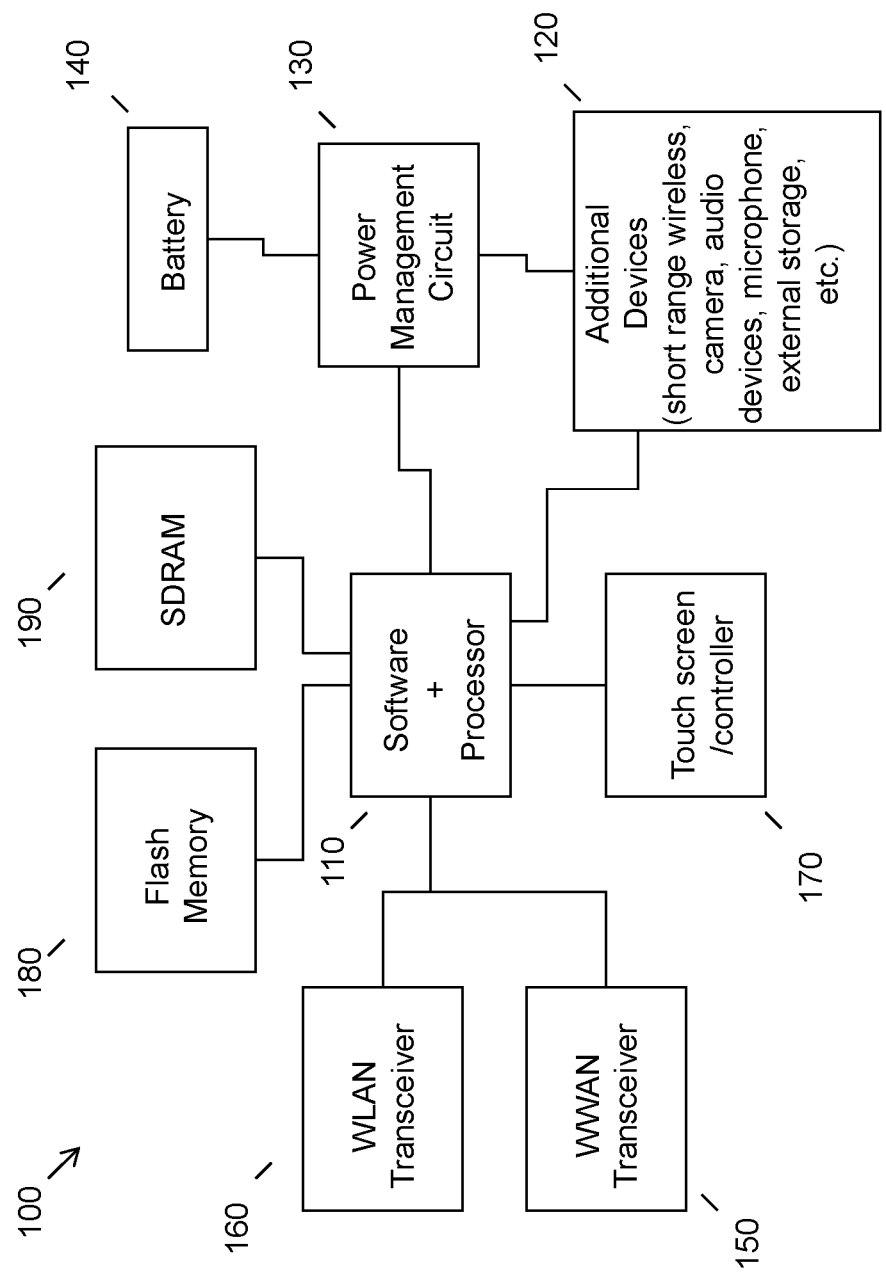
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

There are many benefits to working from home or remotely. As mentioned previously, employees may receive a level a freedom that helps with their personal lives while maintaining a strong presence in the work place, and companies may benefit from the decreased expenses as a result of not requiring as many employees to be in the office. However, when working remotely, the environment in which a user is working may include unconventional disturbances that would not be found in the common work place. For example, when an employee is working from home, a dog may be barking or a child may be crying. These uncommon disturbances may then need immediate attention.

When attending a meeting and a disturbance arises, conventionally, an attendee will have to manually respond to negate the disturbance. Whether that is providing input to an application to mute a microphone on a user device, deactivate a camera sharing a video feed of the user, and/or the like, the system will require user to provide input in order to remove such a disturbance from a meeting. Additionally, or alternatively, the disturbance may require user interaction that causes a user to step away from their device. For example, if a baby is crying, a user will have to step off camera and away from the device to tend to the baby. Prior to stepping away from their device, a user will have to mention verbally in the meeting that they must step away or will provide a message through a messaging portion of an application indicating that they must step away from their device.

Stepping away from the device can happen at inopportune instances and/or may require immediate reaction by the user. Consequently, if a user needs to step away from a meeting, they may miss important information being detailed on the call. Further, stepping away from a meeting to immediately tend to a disturbance, e.g., a baby or child, a user may not have the time to construct a message indicating the situation to excuse their absence. In some situations, an employer may understand the immediate need and excuse the absence. However, in a separate situation, if a user sporadically removes one's self from the meeting, an employer may view that as inexcusable, and thereafter reprimand the user. What is needed is a method that may detect a disturbance either in real-time, and/or anticipate the disturbance, and then provide a message from a user to attendees of the meeting describing the user's current situation.

Accordingly, the described system and method provides a technique for utilizing a messaging generator system to produce a message identifying a disruption present during a meeting, and thereafter providing the message to the other participants in the meeting. A disruption may be detected during a meeting and the device may then identify a source of the disruption. Based upon a determined disruption type, the system may generate a message describing the disruption and provide the message to the other participants of the meeting without the need of additional user input. The disruption is determined while the user is participating in a meeting with at least one participant being located remotely. Thus, the meeting is occurring over a type of communication medium (e.g., a video conference call), rather than occurring with everyone present in the same location. Communication with other participants while in a meeting will occur through an information handling device. Such a system provides an improved method for notifying at least one participant of a disruption requiring user interaction by determining a source of a disruption present in the user's work environment and providing a generated message to the additional participants of the meeting without the need of user input.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, input/output (I/O) ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use serial advanced technology attachment (SATA) or peripheral component interconnect (PCI) or low pin count (LPC). Common interfaces, for example, include secure digital input/output (SDIO) and inter-integrated circuit (I2C).

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply basic input/output system (BIOS) like functionality and dynamic random-access memory (DRAM) memory.

System 100 typically includes one or more of a wireless wide area network (WWAN) transceiver 150 and a wireless local area network (WLAN) transceiver 160 for connecting to various networks, such as telecommunications networks and wireless Internet devices, e.g., access points. Additionally, devices 120 are commonly included, e.g., a wireless communication device, external storage, etc. System 100 often includes a touch screen 170 for data input and display/rendering. System 100 also typically includes various memory devices, for example flash memory 180 and synchronous dynamic random-access memory (SDRAM) 190.

Figure 2:
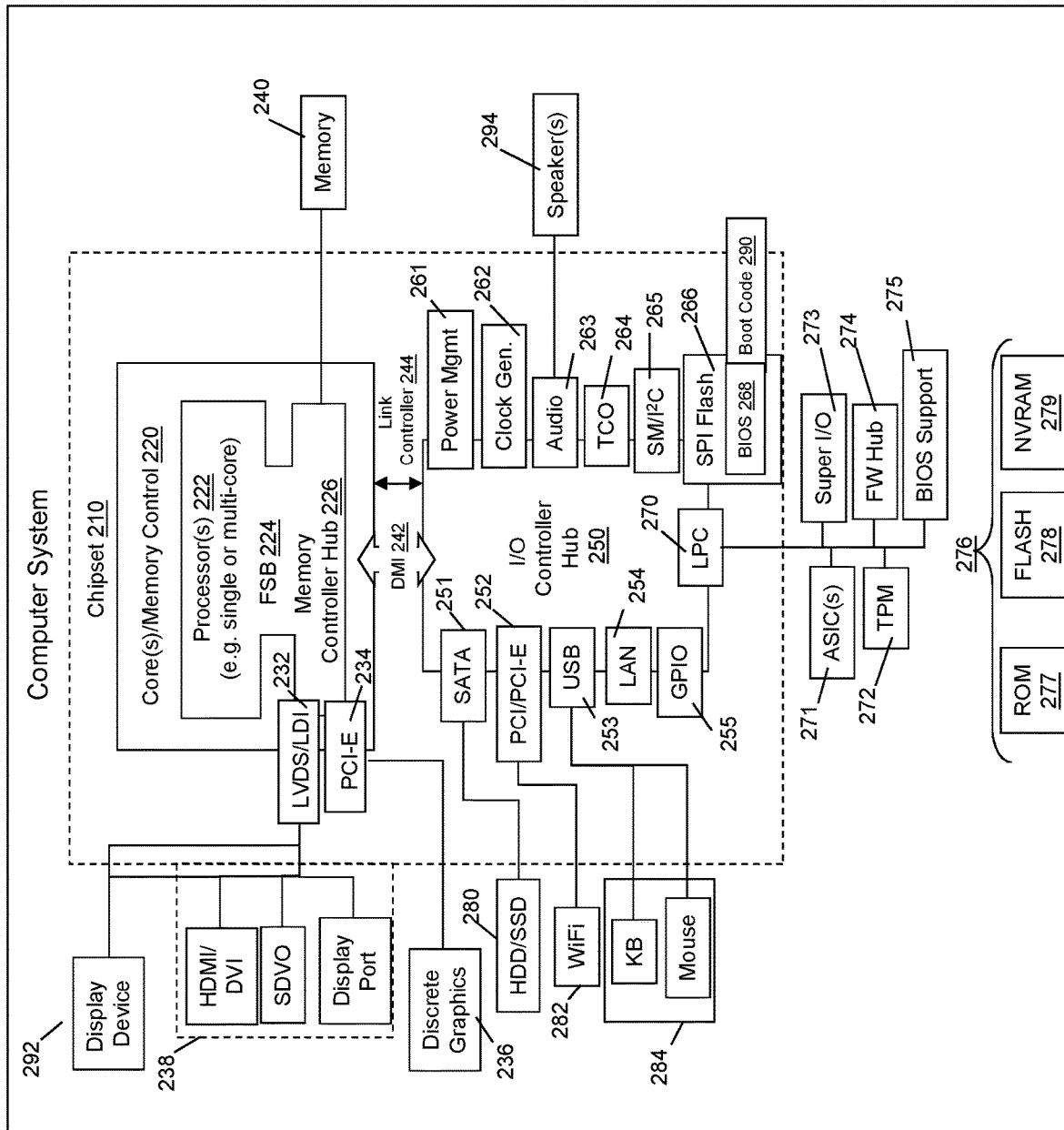
FIG. 2 illustrates another example of information handling device circuitry.

FIG. 2 depicts a block diagram of another example of information handling device circuits, circuitry or components. The example depicted in FIG. 2 may correspond to computing systems such as personal computers, or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of random-access memory (RAM) that may be referred to as "system memory" or "memory"). The memory controller hub 226 further includes a low voltage differential signaling (LVDS) interface 232 for a display device 292 (for example, a cathode-ray tube (CRT), a flat panel, touch screen, etc.). A block 238 includes some technologies that may be supported via the low-voltage differential signaling (LVDS) interface 232 (for example, serial digital video, high-definition multimedia interface/digital visual interface (HDMI/DVI), display port). The memory controller hub 226 also includes a PCI-express interface (PCI-E) 234 that may support discrete graphics 236.

In FIG. 2, the I/O hub controller 250 includes a SATA interface 251 (for example, for hard-disc drives (HDDs), solid-state drives (SSDs), etc., 280), a PCI-E interface 252 (for example, for wireless connections 282), a universal serial bus (USB) interface 253 (for example, for devices 284 such as a digitizer, keyboard, mice, cameras, phones, microphones, storage, other connected devices, etc.), a network interface 254 (for example, local area network (LAN)), a general purpose I/O (GPIO) interface 255, a LPC interface 270 (for application-specific integrated circuit (ASICs) 271, a trusted platform module (TPM) 272, a super I/O 273, a firmware hub 274, BIOS support 275 as well as various types of memory 276 such as read-only memory (ROM) 277, Flash 278, and non-volatile RAM (NVRAM) 279), a power management interface 261, a clock generator interface 262, an audio interface 263 (for example, for speakers 294), a time controlled operations (TCO) interface 264, a system management bus interface 265, and serial peripheral interface (SPI) Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, personal computer devices generally, and/or electronic devices, which may employ a messaging generator system and/or generate a message describing received disruption information present in a user's work environment. For example, the circuitry outlined in FIG. 1 may be implemented in a tablet or smart phone embodiment, whereas the circuitry outlined in FIG. 2 may be implemented in a personal computer embodiment.

FIG. 3 illustrates an example method for generating a message based upon a determined disturbance detected and thereafter providing the message to the attendees of the meeting. The method may be implemented on a system which includes a processor, memory device, output devices (e.g., display device, printer, etc.), input devices (e.g., keyboard, touch screen, mouse, microphones, sensors, biometric scanners, etc.), image capture devices, and/or other components, for example, those discussed in connection with FIG. 1 and/or FIG. 2. While the system may include known hardware and software components and/or hardware and software components developed in the future, the system itself is specifically programmed to perform the functions as described herein to dynamically generate a message for a determined disturbance Additionally, the messaging generator system includes modules and features that are unique to the described system.

Providing a message describing a disruption that is present in a remote participants environment requires a method of detecting the disruption during an active and/or live meeting and determining a source of the disruption. Recognition of the source of the disruption will influence the type of message that may then be provided from the messaging generator system to at least one other participant attending the meeting. In other words, the message provided to the at least one other participant may be dynamically determined based upon the received disruption information.

At 301, the system may detect the disruption within an environment surrounding a user during the meeting through a utilized communication medium containing at least one participant located in a remote location as compared with the user. An environment of a remote user and/or at least one other participant attending a meeting held over a communication medium may be determined prior to joining the meeting. Establishing a remote work environment may require a system to determine where a user is located, and thereafter determine if disruptions may be present during the attending of the meeting. For example, a user working from a home office may be determined to be in a quiet work environment. This quiet work environment may be more susceptible to disruptions.

As another example, a user working from a public location, such as a coffee shop, may be influenced by common commotion that comes with being in such a location, such as the background noise from other customers in the coffee shop, the sounds of brewing coffee machines, and the like. When a user is present in such an environment, it is also common practice to use headphones to negate such disturbances from being detected at a user information handling device. Without the use of headphones, the commotion of a public work space may be continuously detected by a microphone and/or another audio capturing device present on the user information handling device. Additionally, today's headphones commonly include a microphone to pick-up a user's voice when speaking, and may also utilize a noise filtration method to assist with negating any environmental commotion found in the public work space from being shared over the communication medium.

Additionally, or alternatively, the system may determine the environment a user is present within in real-time upon joining a meeting over a communication medium, and reassessing the environment during the meeting. Detecting a disruption while present on the meeting will include deciphering uncommon disruptions within the established environment. For example, when a user is determined to be in a quiet home office setting, the system may detect a dog barking, a baby crying, an oven alarm ringing, and the like. In another example, when a user is determined to the be a public location such as a coffee house, the system may detect another customer yelling, the breaking to a plate, and the like, as being uncommon disruptions that were picked-up by the user's microphone and/or are not regularly filtered out. As described above, detecting a disruption within an environment surrounding a user may occur in a variety of locations; however, for ease of understanding, a quiet, work-from-home environment will be referenced herein. These are not intended to be a limiting example.

A communication medium present on an information handling device may be used to host a meeting with at least one participant being located at a remote location as compared to other participants of the meeting. A communication medium may be used in order to permit discussions over large distances (e.g., not located in the same physical location as other participants). The system may utilize a video communication medium to bring together the user and at least one other remote participant, permitting the sharing of both audio and a video stream from each participant of the meeting. For example, a video communication medium may be a video conferencing application present on a participant's information handling device. Use of such a video communication medium may further assist with establishing an environment of a user and/or other participants in the meeting. For example, the video and/or audio can be parsed to determine characteristics, features, and/or the like, of the environment.

Sensors associated with the video communication medium, such as audio and video sensors, may detect a disruption present in the environment of the user. As is common with the user of video communication mediums, the image data captured from each image capturing device associated with a participant may be accumulated into a single location (e.g., a video conferencing application) and viewed on a display of the information handling device. Similarly, audio data captured from sensors can be accumulated and transmitted over an audio channel. This information can be parsed by the system to identify disruptions. For example, image data can be parsed or analyzed to detect parts of a frame that would indicate a disruption, including other people coming into the frame, the user leaving the frame or turning away from the device, a user accessing another device, commotion within the frame, and/or the like. As another example, audio data can be parsed or analyzed to detect audio that would indicate a disruption, including other people talking, the user talking to another user not in the conference, an audible commotion, identifiable noises that can be correlated to a disruption (e.g., doorbell, knock, breaking glass, notification alerts, timer or schedule alerts, etc.), and/or the like.

Additionally, or alternatively, the system may access user scheduling data to assist with detecting the disruption within in an environment. The system may access user calendar data, email communications, and/or the like, to anticipate a disruption that may occur while in a meeting. For example, the user may receive an email stating that a package requiring a signature may be arriving at a user's home between 1:00 PM and 3:00 PM. The user may also have a scheduled meeting at 2:00 PM. Upon arrival of the package to the user's home, the system may anticipate the disruption of a door bell ringing and/or a knock at the front door. Such anticipation may assist the system in detecting the disruption, and then influence the system's ability to determine a source of the disruption, at 302, and thereafter produce a message to supply to the additional participants in the meeting.

After detecting the within the environment surrounding the user, the system may determine, at 302, if the source of the disruption can be determined. When the system determines that a source of the disruption cannot be determined, at 305, the system may do nothing in relation to attempting to take further action. In other words, when the source cannot be determined, at 302, the system will not move forward with supplying a message to the participants in the meeting. This may result in the user having to use conventional message supplying techniques, such as manually inputting a message and/or verbally providing and potentially sidetracking or pausing a meeting when the user has to tend to a disruption. On the other hand, when a source of the disruption is not identifiable, but the system knows the user is being disrupted, the system may provide a default generic disruption notice or message to other participants in the meeting indicating the user had to step away.

When a source of the disruption can be determined, at 302, the system may then move forward with generating a messaging identifying the disruption, at 303. In determining the source of the disruption, at 302, the system may utilize at least one sensor to assist in identifying the source. A common sensor that may be utilized is an audio capturing device and/or an image capturing device. However, these are non-limiting and other sensors can be utilized, for example, proximity sensors, heat signature detection sensors, vibration detection sensors, and/or the like. Additionally, the sensors may be coupled to the information handling device utilizing the communication medium either integrally and/or operatively. It is common for information handling devices to employ at least one, if not both types, of sensors integral to the information handling device. For example, when the information handling device is an up-to-date laptop computer, the device may contain at least one of each of the sensor types. Additionally, or alternatively, an up-to-date laptop may utilize a connection means (e.g., wireless connection, wired connection, etc.) to operatively couple at least one sensor to the information handling device in use.

Determining a source of the disruption may include identifying what has caused the disruption, but does not necessarily include identifying what specifically caused the disruption. For example, the system may identify a source of the disruption as something breaking, but does not necessarily determine what specifically broke. As another example, the system may identify a source of the disruption as another person, but does not necessarily determine or identify the specific person causing the disruption. On the other hand, the system may determine a specific source of the disruption.

To determine the source of the disruption, the system may compare identified characteristics of the disruption to characteristics of identified disruptions. For example, if the disruption is detected via an audio sensor, the system may compare the audio characteristics to a database or data store of labeled audio characteristics. Upon detecting a match or similarities between the detected audio characteristics and a labeled audio signal, the system may then identify the detected disruption as the matching or similar audio signal and the source as corresponding to the label of the matching or similar audio signal. In a similar example, if the disruption is detected via an image sensor, the system can compare visual characteristics to labeled images, find a match or similar image, and identify the disruption as the labeled disruption. Similar techniques can be used for other sensor types, for example, comparing heat signatures to labeled or known heat signatures, comparing proximity information to known proximity information, and/or the like. It should be noted that the system may identify a match as an audio signal, image, and/or the like, having similarities above a predetermined threshold, being an exact match, and/or the like.

Determining the source of the disruption, at 302, may further include identifying a type of disruption based upon the source providing the disruption. In other words, detection of the disruption in an environment, at 301, may then be utilized to describe the source of the disruption. For example, if the device detects barking in the environment, the system may determine, at 302, that a dog is providing the disruption. The source of the disruption may be important when generating a message identifying the disruption, at 303. Additionally, coinciding with determining the source of a disruption, at 302, based upon a detected disruption type, the system may access a storage location and/or a database comprising a plurality of disruption types. The system may compare the disruption information detected, at 301, to the plurality of saved disruption types in order to determine a type of the disruption, and thereafter determine a source of the disruption, at 302. This comparing of the detected disruption, at 301, to the storage device and/or database housing the plurality of past disruption types may then save the association made by the system, and may be referenced in the future when attempting to determine a different, yet similar source of a disruption.

Once the source of the detected disruption is determined, at 302, the system may utilize a messaging generator system to generate a message identifying the disruption, at 303. A messaging generator system employed by the information handling device of the user may utilize the disruption type and/or determined disruption source to generate a message that will then be provided to the at least one other participant present in the meeting, at 304. Generating of the message for identifying the disruption, at 303, by use of the messaging generator system, may describe context about the disruption. For example, continuing with a previous example, if the system detects that barking is present and the system concludes that a dog is the source of the barking, the messaging generator system, utilized at 303, may generate a message stating, "[M]y dog is barking and I must let them outside." In the system, the context of the message is the dog barking and the need to let them go outside, which would result in the user having to step away from their device and needing to step away from the meeting.

Further, the context of the disruption generated by the messaging generator system may also include a reason for the disruption and/or a current duration or expected duration of the disruption. Referring back the dog barking example, a reason for the disruption may include that the dog is barking around noon because that is typically when the dog is let outside. Additionally, or alternatively, the duration of the disruption may be included in the context of the message being generated, at 303. For example, if the dog is barking for 30 seconds, the message may include this extended period of barking in the message to provide context about the urgency associated with stepping away from the meeting. As a non-limiting example, such reasoning and duration of time may be included in the message by, "[M]y dog has been barking for the last 30 seconds, and I must let them outside." Such a message may be concise while also providing context as to why a user must step away from their device, which also may provide an idea of when the user may return to the meeting. The system may also identify how long it takes the user to let the dog out and may provide information indicating when the user will return to the device.

It should be noted that the example used refers to the user stepping away from the device, but similar messages may be provided if a user can remain in the meeting but must mute the device, for example, to prevent others from being bombarded with noises in the background or stop the video feed, for example, to prevent others from being able to see the disruption.

In the system, an amount of information utilized by the messaging generator system may be customizable by the user. A user may not wish to generate a message, and potentially provide the message to the additional participants in the meeting over the communication medium, with a high level of context. The system may be designed by the user to provide a vaguer message. On the other hand, the messaging generator system may be customized by the user to provide more context related to the disruption and the source of the disruption, providing a more detailed message to the at least one other participant present in the meeting. The amount of context provided within the message may also vary with meeting types, participants in the meeting, the source or type of disruption, the length of the disruption, the length of time the user will be away from the device, and/or the like.

After the messaging generator system generates a message identifying the disruption, at 303, the system may then provide the generated message to the at least one other participant in present in the meeting, at 304. In the system, providing the message, at 304, may occur automatically after generating the message. Rather than requiring user input prior to provide the message, at 304, and potentially influencing a user's ability to timely react to a disruption present in the environment surrounding them, automatically providing the message to participants present in the meeting may allow a user to respond to a disruption when needed. In other words, the message can be generated and provided to other participants after the user has already stepped away from the device and meeting to address the disruption.

A common trait of a communication medium, particularly a video communication medium, is the presence of the messaging portion within the application. The messaging portion within the communication medium permits the sending of text-based messages to the entire meeting and/or a specific participant that is on the call. When providing the message to a least one participant in the meeting, the system may provide the message in the messaging portion of the communication medium. Additionally, or alternatively, providing the generated message to the participants of the meeting, at 304, may be supplied to the at least one participant via an alternative communication method. Depending on the disruption source, the disruption type, the length of the disruption, and/or the like, the system may determine that the message should not be supplied through a messaging portion of the application. Additionally, or alternatively, the application may not include a message portion.

When the system cannot or should not provide the message describing the context through the video communication medium, the system may utilize the alternative form of communication. For example, an email may be associated with each participant present in the meeting. The messaging generator system may generate a message in an email form, and send the generated message from the user's email to the at least one other email of the at least one other participant of the meeting. The messaging generator system can utilize multiple alternative methods to provide the message describing the disruption and the context surrounding the disruption to assure that the at least one other participant is aware of the situation of the user.

The various embodiments described herein thus represent a technical improvement to conventional methods for notifying at least one participant of a disruption requiring user interaction by determining a source of a disruption present in the user's work environment, and providing a generated message to the additional participants of the meeting without the need of user input. The system provides a technique for utilizing a messaging generator system to produce a message identifying a disruption present during a meeting, and thereafter provides the message to the other participants in the meeting. The use of a messaging generator provides the system with the ability to detect a disruption, determine a source of that disruption, and then provide a user customizable message to the additional participants present in the meeting while the user moves away from their device. The system may permit a user to timely respond to a disturbance, while also providing an explanation as to why the user had to remove themselves from meeting.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random-access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Additionally, the term "non-transitory" includes all media except signal media.

Program code embodied on a storage medium may be transmitted using any appropriate medium, including but not limited to wireless, wireline, optical fiber cable, radio frequency, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
    detecting, during a meeting, a current disruption within an environment surrounding a user, wherein the meeting is facilitated using a communication medium and comprises at least one participant remote to the user;
    determining, utilizing at least one sensor and a remote storage device, a source of the current disruption, wherein the determining comprises comparing at least one identified characteristic of the current disruption to characteristics of a plurality of identified disruptions stored within the remote storage device, wherein the source of the current disruption influences an amount of information of the current disruption utilized by a messaging generator system;
    generating, utilizing the messaging generator system, a message identifying the current disruption, wherein the message provides context about the current disruption as identified from the source of the current disruption, wherein the context identifies at least one of: a reason for the current disruption and duration of the current disruption, wherein generating the message comprises utilizing the determined source of the current disruption and the context of the current disruption for providing a level of context of the current disruption to at least one participant of the meeting and wherein the level of the context provided within the message is customized by the user, wherein the level of context provided within the message is predetermined by the user and correlated with the source of the current disruption; and
    providing, to the at least one participant, the message, wherein the providing comprises notifying the at least one participant while the current disruption is occurring.

2. The method of claim 1, wherein the communication medium comprises a video communication medium.

3. The method of claim 1, wherein the at least one sensor comprises an audio capturing device.

4. The method of claim 1, wherein the at least one sensor comprises an image capturing device.

5. The method of claim 1, wherein the providing comprises providing the message in a messaging portion of the meeting.

6. The method of claim 1, wherein the providing comprises automatically providing the message.

7. The method of claim 1, wherein the determining comprises determining the type of disruption based upon the source.

8. The method of claim 7, wherein the determining a type of disruption comprises comparing information received from the at least one sensor to a plurality of disruption types.

9. An information handling device, the information handling device comprising:
    a processor;
    a remote storage device;
    a memory device that stores instructions that, when executed by the processor, causes the information handling device to:
    detect, during a meeting, a current disruption within an environment surrounding a user, wherein the meeting is facilitated using a communication medium and comprise at least one participant remote of the user;
    determine, utilizing a least one sensor and the remote storage device, a source of the current disruption, wherein to determine comprises comparing at least one identified characteristic of the current disruption to characteristics of a plurality of identified disruptions stored within the remote storage device, wherein the source of the current disruption influences an amount of information of the current disruption utilized by a messaging generator system;

generate, utilizing a messaging generator system, a message identifying the current disruption, wherein the message provides context about the current disruption as identified from the source of the current disruption, wherein the context identifies at least one of: a reason for the current disruption and duration of the current disruption, wherein to generate the message comprises utilizing the determined source of the current disruption and the context of the current disruption for providing a level of context of the current disruption to at least one participant of the meeting and wherein the level of the context provided within the message is customized by the user, wherein the level of context provided within the message is predetermined by the user and correlated with the source of the current disruption; and provide, to the at least one participant, the message, wherein the providing comprises notifying the at least one participant while the current disruption is occurring.

10. The information handling device of claim 9, wherein the communication medium comprises a video communication medium.

11. The information handling device of claim 9, wherein the at least one sensor comprises an audio capturing device.

12. The information handling device of claim 9, wherein the at least one sensor comprises an image capturing device.

13. The information handling device of claim 9, wherein the providing comprises automatically providing the message.

14. The information handling device of claim 9, wherein the determining comprises determining a type of disruption based upon the source.

15. The information handling device of claim 14, wherein the determining a type of disruption comprises comparing information received from the at least one sensor to a plurality of disruption types.

16. A product, the product comprising:

a computer-readable storage device that stores executable code that, when executed by the processor, causes the product to:

detect, during a meeting, a current disruption within an environment surrounding a user, wherein the meeting is facilitated using a communication medium and comprise at least one participant remote of the user;

determine, utilizing a least one sensor and a remote storage device, a source of the current disruption, wherein to determine comprises comparing at least one identified characteristic of the current disruption to characteristics of a plurality of identified disruptions stored within the remote storage device, wherein the source of the current disruption influences an amount of information of the current disruption utilized by a messaging generator system;

generate, utilizing the messaging generator system, a message identifying the current disruption, wherein the message provides context about the current disruption as identified from the source of the current disruption, wherein the context identifies at least one of: a reason for the current disruption and duration of the current disruption, wherein to generate the message comprises utilizing the determined source of the current disruption and the context of the current disruption for providing a level of context of the current disruption to at least one participant of the meeting and wherein the level of the context provided within the message is customized by the user, wherein the level of context provided within the message is predetermined by the user and correlated with the source of the current disruption; and provide, to the at least one participant, the message, wherein the providing comprises notifying the at least one participant while the current disruption is occurring.

17. The method of claim 1, wherein the context of the current disruption comprises an expected time period identifying how long the user may be away from a user device.

18. The method of claim 1, wherein the message provides a level of urgency associated with the user stepping away from the meeting.

19. The information handling device of claim 9, wherein the context of the current disruption comprises an expected time period identifying how long the user may be away from a user device.

20. The information handling device of claim 9, wherein the message provides a level of urgency associated with the user stepping away from the meeting.

* * * * *